United States Patent
West et al.

(10) Patent No.: US 9,855,961 B2
(45) Date of Patent: Jan. 2, 2018

(54) RAILROAD LOCOMOTIVE MONITORING SYSTEM CONFIGURATION SYSTEM AND METHOD

(71) Applicant: Westinghouse Air Brake Technologies Corporation, Wilmerding, PA (US)

(72) Inventors: Micheal John West, Potomac, MD (US); Theodore E. Allwardt, Frederick, MD (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 15/012,504

(22) Filed: Feb. 1, 2016

(65) Prior Publication Data
US 2017/0217462 A1    Aug. 3, 2017

(51) Int. Cl.
| | |
|---|---|
| *B61L 27/00* | (2006.01) |
| *G01M 17/08* | (2006.01) |
| *B61L 25/04* | (2006.01) |
| *G07C 5/08* | (2006.01) |
| *B61K 9/00* | (2006.01) |
| *B61L 25/02* | (2006.01) |

(52) U.S. Cl.
CPC ............ *B61L 27/0077* (2013.01); *B61K 9/00* (2013.01); *B61L 25/025* (2013.01); *B61L 25/04* (2013.01); *B61L 27/0005* (2013.01); *G01M 17/08* (2013.01); *G07C 5/085* (2013.01); *B61L 2205/00* (2013.01); *B61L 2205/04* (2013.01)

(58) Field of Classification Search
CPC .... B61L 27/0077; B61L 25/025; B61L 25/04; B61L 27/0005; B61L 2205/00; B61L 2205/04; B61K 9/00; G01M 17/08; G07C 5/085
See application file for complete search history.

(56) References Cited

U.S. PATENT DOCUMENTS

| | | | | |
|---|---|---|---|---|
| 5,806,011 A | * | 9/1998 | Azzaro | F01P 11/16 123/339.24 |
| 5,884,202 A | * | 3/1999 | Arjomand | G01M 15/05 340/12.54 |
| 6,487,478 B1 | * | 11/2002 | Azzaro | B60L 3/12 340/3.1 |
| 6,668,216 B2 | * | 12/2003 | Mays | B61L 15/0027 340/438 |
| 6,950,829 B2 | * | 9/2005 | Schlabach | B61L 27/0094 |
| 7,688,218 B2 | * | 3/2010 | LeFebvre | B61K 9/00 246/169 R |

(Continued)

FOREIGN PATENT DOCUMENTS

| | | | | |
|---|---|---|---|---|
| EP | 1085636 A2 | * | 3/2001 | ......... G06Q 30/0241 |
| EP | 2279926 A1 | * | 2/2011 | .......... B61L 15/0063 |

*Primary Examiner* — Tuan C To
(74) *Attorney, Agent, or Firm* — The Webb Law Firm

(57) ABSTRACT

A railroad locomotive monitoring system configuration system for a plurality of trains comprising: a monitoring system, and an on-board computer programmed or configured to: determine or receive railroad locomotive data; determine or receive railroad operation data; determine or receive configuration data; and based at least partially on at least a portion of the railroad locomotive data, at least a portion of the railroad operation data, and at least a portion of the configuration data, automatically configure at least one setting of the at least one component of the monitoring system.

24 Claims, 2 Drawing Sheets

(56) References Cited

U.S. PATENT DOCUMENTS

| | | | | |
|---|---|---|---|---|
| 2002/0143421 | A1* | 10/2002 | Wetzer | G06Q 10/06 700/100 |
| 2002/0156692 | A1* | 10/2002 | Squeglia | G06Q 10/087 705/26.81 |
| 2002/0198997 | A1* | 12/2002 | Linthicum | H04L 69/40 709/226 |
| 2006/0025903 | A1* | 2/2006 | Kumar | B61L 15/0081 701/19 |
| 2006/0212186 | A1* | 9/2006 | Philp | B61L 27/0016 701/19 |
| 2006/0212187 | A1* | 9/2006 | Wills | B61L 27/0016 701/19 |
| 2006/0212189 | A1* | 9/2006 | Kickbusch | B61L 27/0011 701/19 |
| 2006/0212190 | A1* | 9/2006 | Philp | B61L 27/0016 701/19 |
| 2007/0156307 | A1* | 7/2007 | Muinonen | B61L 17/00 701/19 |
| 2007/0233335 | A1* | 10/2007 | Kumar | B61L 3/006 701/22 |
| 2007/0260368 | A1* | 11/2007 | Philp | B61L 27/0027 701/19 |
| 2007/0260369 | A1* | 11/2007 | Philp | B61L 27/0027 701/19 |
| 2008/0005050 | A1* | 1/2008 | Daum | G06Q 10/04 706/19 |
| 2009/0003985 | A1* | 1/2009 | Lanigan, Sr. | B66C 19/007 414/814 |
| 2010/0235022 | A1* | 9/2010 | Siddappa | B61C 17/12 701/20 |
| 2011/0270475 | A1* | 11/2011 | Brand | B61L 15/0027 701/20 |
| 2015/0232097 | A1* | 8/2015 | Luther | B61L 3/006 701/123 |

\* cited by examiner

RAILROAD LOCOMOTIVE MONITORING SYSTEM CONFIGURATION SYSTEM AND METHOD

BACKGROUND OF THE INVENTION

Field of the Invention

This invention relates generally to configurable monitoring processes and systems related to vehicle systems, such as railway systems, including trains travelling in a railroad's track network, and, in particular, to an improved railroad locomotive monitoring system, configuration system, and method for use in connection with the locomotives or control cars of trains travelling in the railroad's track network.

Description of Related Art

Vehicle systems and networks exist throughout the world, and, at any point in time, a multitude of vehicles, such as cars, trucks, buses, trains, and the like, are travelling throughout the system and network. With specific reference to trains travelling in a track network, the locomotives of such trains are typically equipped with or operated using train control, communication, and management systems (e.g., Positive Train Control (PTC) systems), such as the I-ETMS® of Wabtec Corporation. Such train control systems normally include at least one on-board computer (or controller) that is used to manage and control the various actions of the train through interaction with the operator.

It is common practice in various geographic locations, e.g., North America, and in certain applications for railroad operators, e.g., freight operators, to interchange locomotives or control cars between various railroad operators. When a locomotive is interchanged (or exchanged), the locomotive owned by one railroad operator may be operated on the track or within the track network of another railroad operator, often by the other railroad operator's crew. Further, locomotives may be interchanged for extended periods of time, between multiple railroad operators, and may be operated across the receiving railroad operator's track network.

As is known, many railroad operators are implemented monitoring technology and related systems, such as voice recording or in-cab video recording, in their locomotives for safety and accident investigation purposes. It is possible that the data collected by these monitoring systems could also be used for disciplinary purposes. This technology may be implemented on a railroad-operator-by-railroad-operator basis, and is not implemented in any uniformly adopted or standardized manner. The use of this technology is often subject to union contracts and negotiations that may vary from one railroad operator to the next. For example, it may occur that one railroad operator may reach a collective bargaining agreement with its engineers and conductors unions, and adopt an in-cab video and/or voice recording system for its fleet. However, it is highly likely that one or more of those locomotives that are equipped with in-cab monitoring devices would be interchanged for use by other railroad operators that have not negotiated the use of in-cab monitoring systems with its various unions. When the crew of the receiving railroad operator operates the locomotive, these in-cab monitoring systems would be operable and potentially result in labor disputes and grievances with the receiving railroad operator.

It is envisioned that PTC systems, such as the I-ETMS® of Wabtec Corporation, will be widely deployed across North American railroads. One of the attributes of such a PTC system is that the on-board computer has or can establish the owner of the track on which the train is operating. Accordingly, there is a need in the art to manage and coordinate the operation and/or configuration of a monitoring device or system that is related to the in-cab video and/or voice recording processes.

SUMMARY OF THE INVENTION

Generally, provided are improved railroad locomotive monitoring system configuration systems and methods for use in connection with trains travelling in a track network. Preferably, provided are railroad locomotive monitoring system configuration systems and methods that provide monitoring and control features that result in computer-implemented processes for use in connection with a train. Preferably, provided are railroad locomotive monitoring system configuration systems and methods that provide an automated process that improves railroad compliance with specified rules, policies, agreements, and the like. Preferably, provided are railroad locomotive monitoring system configuration systems and methods that facilitate effective interchange of locomotives or control cars between railroad operators.

In one preferred and non-limiting embodiment or aspect, provided is a railroad locomotive monitoring system configuration system for a plurality of trains, each having at least one locomotive or control car, operating in at least one railroad's track network, the system comprising: at least one monitoring system configured to record or monitor at least one parameter or condition in or associated with the at least one locomotive or control car; and an on-board computer located on or associated with the at least one locomotive or control car and programmed or configured to: (i) determine or receive railroad locomotive data representing information or data related to the at least one locomotive or control car; (ii) determine or receive railroad operation data representing information or data related to at least one of the following: the railroad that owns the locomotive or control car, the railroad that owns the track on which the at least one locomotive or control car is operating, the railroad that employs at least one member of at least one crew that is operating the at least one locomotive or control car, or any combination thereof; (iii) determine or receive configuration data representing information or data related to at least one setting of or associated with at least one component of the at least one monitoring system; and (iv) based at least partially on at least a portion of the railroad locomotive data, at least a portion of the railroad operation data, and at least a portion of the configuration data, automatically configure at least one setting of the at least one component of the at least one monitoring system.

In one preferred and non-limiting embodiment or aspect, the at least one monitoring system comprises at least one of the following: at least one camera device, at least one video camera device, at least one sound recording device, at least one control feedback device, at least one interface, at least one camera interface, et least one video camera interface, at least one sound recording interface, at least one control feedback interface, or any combination thereof.

In one preferred and non-limiting embodiment or aspect, at least a portion of the configuration data is generated or identified based at least partially on compliance data, which comprises information or data related to the railroad's obligations or requirements pursuant to at least one of the following: a contract, an agreement, a labor agreement, a policy, a Federal Railroad Association policy, a code, a law, or any combination thereof.

In one preferred and non-limiting embodiment or aspect, the automatic configuration comprises enabling or disabling at least one of the following: operation of at least one component of the at least one monitoring system, at least one setting of at least one component of the at least one monitoring system, or any combination thereof.

In one preferred and non-limiting embodiment or aspect, at least one of the following: at least a portion of the railroad locomotive data, at least a portion of the railroad track data, at least a portion of the configuration data, or any combination thereof, is populated on at least one database on or associated with the at least one locomotive or control car. In another preferred and non-limiting embodiment or aspect, at least one of the following: at least a portion of the railroad locomotive data, at least a portion of the railroad track data, at least a portion of the configuration data, or any combination thereof, is directly or indirectly transmitted by at least one remote server to the at least one database on or associated with the at least one locomotive or control car. In a further preferred and non-limiting embodiment or aspect, the transmission occurs prior to the locomotive or control car traversing at least one specified portion of track. In a further preferred and non-limiting embodiment or aspect, the transmission occurs prior to operation of the locomotive or control car by the at least one crew.

In one preferred and non-limiting embodiment or aspect, at least one of the following: at least a portion of the railroad locomotive data, at least a portion of the railroad track data, at least a portion of the configuration data, or any combination thereof, is populated on at least one database on or associated with at least one of the following: the railroad that owns the locomotive or control car, the railroad that owns the track on which the at least one locomotive or control car is operating, the railroad that employs at least one member of at least one crew that is operating the at least one locomotive or control car, or any combination thereof. In another preferred and non-limiting embodiment or aspect, at least one of the following: at least a portion of the railroad locomotive data, at least a portion of the railroad track data, at least a portion of the configuration data, or any combination thereof, is directly or indirectly transmitted from the at least one database on or associated with the at least one locomotive or control car. In a further preferred and non-limiting embodiment or aspect, the transmission occurs prior to the locomotive or control car traversing at least one specified portion of track. In a further preferred and non-limiting embodiment or aspect, the transmission occurs prior to operation of the locomotive or control car by the at least one crew.

In one preferred and non-limiting embodiment or aspect, the automatic configuration comprises enabling or disabling at least one of the following: access to the data generated by the at least one monitoring system, communicating data generated by the at least one monitoring system, uploading data to the at least one monitoring system, downloading data from the at least one monitoring system, or any combination thereof. In another preferred and non-limiting embodiment or aspect, the enablement or disablement is based at least partially on at least one of the following: at least a portion of the railroad locomotive data, at least a portion of the railroad track data, at least a portion of the configuration data, or any combination thereof.

In one preferred and non-limiting embodiment or aspect, the at least one-board computer is further programmed or configured to determine or receive interchange data comprising information or data related to interchange usage of the at least one locomotive or control car. In another preferred and non-limiting embodiment or aspect, at least a portion of the interchange data is generated based at least partially on at least one of the following: at least a portion of the railroad locomotive data, at least a portion of the railroad track data, at least a portion of the configuration data, or any combination thereof. In a further preferred and non-limiting embodiment or aspect, the interchange data comprises at least one of the following: interchange usage data, invoicing data, interchange event data, interchange log data, verification data, tag data, or any combination thereof.

In one preferred and non-limiting embodiment or aspect, the at least one on-board computer is further programmed or configured to receive remote command data from at least one remote server, wherein the remote command data comprises information or data related to the remote control of the at least one component of the at least one monitoring system.

In one preferred and non-limiting embodiment or aspect, the on-board computer is further programmed or configured to determine at least a portion of the railroad operation data based upon data received from at least one positioning system.

In one preferred and non-limiting embodiment or aspect, provided is a railroad locomotive monitoring system configuration system for a plurality of trains, each having at least one locomotive or control car, operating in at least one railroad's track network, the system comprising: at least one monitoring system configured to record or monitor at least one parameter or condition in or associated with the at least one locomotive or control car; and an on-board computer located on or associated with the at least one locomotive or control car and programmed or configured to: (i) determine or receive railroad locomotive data representing information or data related to the at least one locomotive or control car; (ii) determine or receive railroad operation data representing information or data related to at least one of the following: the railroad that owns the locomotive or control car, the railroad that owns the track on which the at least one locomotive or control car is operating, the railroad that employs at least one member of at least one crew that is operating the at least one locomotive or control car, or any combination thereof; (iii) determine or receive compliance data representing information or data related to the railroad's obligations or requirements pursuant to at least one of the following: a contract, an agreement, a labor agreement, a policy, a Federal Railroad Association policy, a code, a law, or any combination thereof; and (iv) based at least partially on at least a portion of the railroad locomotive data, at least a portion of the railroad operation data, and at least a portion of the compliance data, automatically configure at least one setting of the at least one component of the at least one monitoring system.

In one preferred and non-limiting embodiment or aspect, provided is a railroad locomotive monitoring system configuration method for a plurality of trains, each having at least one locomotive or control car, operating in at least one railroad's track network, wherein the at least one locomotive or control car comprises at least one monitoring system configured to record or monitor at least one parameter or condition in or associated with the at least one locomotive or control car, the method comprising: (i) determining or receiving railroad locomotive data representing information or data related to the at least one locomotive or control car; (ii) determining or receiving railroad operation data representing information or data related to at least one of the following: the railroad that owns the locomotive or control car, the railroad that owns the track on which the at least one locomotive or control car is operating, the railroad that employs at least one member of at least one crew that is operating the at least one locomotive or control car, or any combination thereof; (iii) determining or receiving configuration data representing information or data related to at least one setting of or associated with at least one component of the at least one monitoring system; and (iv) based at least partially on at least a portion of the railroad locomotive data, at least a portion of the railroad operation data, and at least a portion of the configuration data, automatically configuring at least one setting of the at least one component of the at least one monitoring system.

In one preferred and non-limiting embodiment or aspect, provided is a railroad locomotive monitoring system configuration method for a plurality of trains, each having at least one locomotive or control car, operating in at least one railroad's track network, wherein the at least one locomotive or control car comprises at least one monitoring system configured to record or monitor at least one parameter or condition in or associated with the at least one locomotive or control car, the method comprising: (i) determining or receiving railroad locomotive data representing information or data related to the at least one locomotive or control car; (ii) determining or receiving railroad operation data representing information or data related to at least one of the following: the railroad that owns the locomotive or control car, the railroad that owns the track on which the at least one locomotive or control car is operating, the railroad that employs at least one member of at least one crew that is operating the at least one locomotive or control car, or any combination thereof; (iii) determining or receiving compliance data representing information or data related to the railroad's obligations or requirements pursuant to at least one of the following: a contract, an agreement, a labor agreement, a policy, a Federal Railroad Association policy, a code, a law, or any combination thereof; and (iv) based at least partially on at least a portion of the railroad locomotive data, at least a portion of the railroad operation data, and at least a portion of the compliance data, automatically configuring at least one setting of the at least one component of the at least one monitoring system.

In one preferred and non-limiting embodiment or aspect, provided is a railroad locomotive configuration system for a plurality of trains, each having at least one locomotive or control car, operating in at least one railroad's track network, the system comprising: at least one functional component or system configured to implement at least one train control function; and an on-board computer located on or associated with the at least one locomotive or control car and programmed or configured to: (i) determine or receive railroad locomotive data representing information or data related to the at least one locomotive or control car; (ii) determine or receive railroad operation data representing information or data related to at least one of the following: the railroad that owns the locomotive or control car, the railroad that owns the track on which the at least one locomotive or control car is operating, the railroad that employs at least one member of at least one crew that is operating the at least one locomotive or control car, or any combination thereof; (iii) determine or receive configuration data representing information or data related to at least one setting of or associated with the at least one functional component or system; and (iv) based at least partially on at least a portion of the railroad locomotive data, at least a portion of the railroad operation data, and at least a portion of the configuration data, automatically configure at least one setting of the at least one functional component or system. In another preferred and non-limiting embodiment or aspect, the at least one functional component or system comprises at least one of the following: a monitoring component or system, a train control component or system, a braking component or system, a throttle component or system, a communication component or system, a display component or system, a configurable component or system, or any combination thereof.

Certain further preferred and non-limiting embodiments or aspects are included as set forth in the following numbered clauses:

Clause 1. A railroad locomotive monitoring system configuration system for a plurality of trains, each having at least one locomotive or control car, operating in at least one railroad's track network, the system comprising: at least one monitoring system configured to record or monitor at least one parameter or condition in or associated with the at least one locomotive or control car; and an on-board computer located on or associated with the at least one locomotive or control car and programmed or configured to: (i) determine or receive railroad locomotive data representing information or data related to the at least one locomotive or control car; (ii) determine or receive railroad operation data representing information or data related to at least one of the following: the railroad that owns the locomotive or control car, the railroad that owns the track on which the at least one locomotive or control car is operating, the railroad that employs at least one member of at least one crew that is operating the at least one locomotive or control car, or any combination thereof; (iii) determine or receive configuration data representing information or data related to at least one setting of or associated with at least one component of the at least one monitoring system; and (iv) based at least partially on at least a portion of the railroad locomotive data, at least a portion of the railroad operation data, and at least a portion of the configuration data, automatically configure at least one setting of the at least one component of the at least one monitoring system.

Clause 2. The railroad locomotive monitoring system configuration system of clause 1, wherein the at least one monitoring system comprises at least one of the following: at least one camera device, at least one video camera device, at least one sound recording device, at least one control feedback device, at least one interface, at least one camera interface, at least one video camera interface, at least one sound recording interface, at least one control feedback interface, or any combination thereof.

Clause 3. The railroad locomotive monitoring system configuration system of clauses 1 or 2, wherein at least a portion of the configuration data is generated or identified based at least partially on compliance data, which comprises information or data related to the railroad's obligations or requirements pursuant to at least one of the following: a contract, an agreement, a labor agreement, a policy, a Federal Railroad Association policy, a code, a law, or any combination thereof.

Clause 4. The railroad locomotive monitoring system configuration system of any of clauses 1-3, wherein the automatic configuration comprises enabling or disabling at least one of the following: operation of at least one component of the at least one monitoring system, at least one setting of at least one component of the at least one monitoring system, or any combination thereof.

Clause 5. The railroad locomotive monitoring system configuration system of any of clauses 1-4, wherein at least one of the following: at least a portion of the railroad locomotive data, at least a portion of the railroad track data, at least a portion of the configuration data, or any combination thereof, is populated on at least one database on or associated with the at least one locomotive or control car.

Clause 6. The railroad locomotive monitoring system configuration system of any of clauses 1-5, wherein at least one of the following: at least a portion of the railroad locomotive data, at least a portion of the railroad track data, at least a portion of the configuration data, or any combination thereof, is directly or indirectly transmitted by at least one remote server to the at least one database on or associated with the at least one locomotive or control car.

Clause 7. The railroad locomotive monitoring system configuration system of any of clauses 1-6, wherein the transmission occurs prior to the locomotive or control car traversing at least one specified portion of track.

Clause 8. The railroad locomotive monitoring system configuration system of any of clauses 1-7, wherein the transmission occurs prior to operation of the locomotive or control car by the at least one crew.

Clause 9. The railroad locomotive monitoring system configuration system of any of clauses 1-8, wherein at least one of the following: at least a portion of the railroad locomotive data, at least a portion of the railroad track data, at least a portion of the configuration data, or any combination thereof, is populated on at least one database, on or associated with, at least one of the following: the railroad that owns the locomotive or control car, the railroad that owns the track on which the at least one locomotive or control car is operating, the railroad that employs at least one member of at least one crew that is operating the at least one locomotive or control car, or any combination thereof.

Clause 10. The railroad locomotive monitoring system configuration system of any of clauses 1-9, wherein at least one of the following: at least a portion of the railroad locomotive data, at least a portion of the railroad track data, at least a portion of the configuration data, or any combination thereof, is directly or indirectly transmitted from the at least one database on or associated with the at least one locomotive or control car.

Clause 11. The railroad locomotive monitoring system configuration system of any of clauses 1-10, wherein the transmission occurs prior to the locomotive or control car traversing at least one specified portion of track.

Clause 12. The railroad locomotive monitoring system configuration system of any of clauses 1-11, wherein the transmission occurs prior to operation of the locomotive or control car by the at least one crew.

Clause 13. The railroad locomotive monitoring system configuration system of any of clauses 1-12, wherein the automatic configuration comprises enabling or disabling at least one of the following: access to the data generated by the at least one monitoring system, communicating data generated by the at least one monitoring system, uploading data to the at least one monitoring system, downloading data from the at least one monitoring system, or any combination thereof.

Clause 14. The railroad locomotive monitoring system configuration system of any of clauses 1-13, wherein the enablement or disablement is based at least partially on at least one of the following: at least a portion of the railroad locomotive data, at least a portion of the railroad track data, at least a portion of the configuration data, or any combination thereof.

Clause 15. The railroad locomotive monitoring system configuration system of any of clauses 1-14, wherein the at least one-board computer is further programmed or configured to determine or receive interchange data comprising information or data related to interchange usage of the at least one locomotive or control car.

Clause 16. The railroad locomotive monitoring system configuration system of any of clauses 1-15, wherein at least a portion of the interchange data is generated based at least partially on at least one of the following: at least a portion of the railroad locomotive data, at least a portion of the railroad track data, at least a portion of the configuration data, or any combination thereof.

Clause 17. The railroad locomotive monitoring system configuration system of any of clauses 1-16, wherein the interchange data comprises at least one of the following: interchange usage data, invoicing data, interchange event data, interchange log data, verification data, tag data, or any combination thereof.

Clause 18. The railroad locomotive monitoring system configuration system of any of clauses 1-17, wherein the at least one on-board computer is further programmed or configured to receive remote command data from at least one remote server, wherein the remote command data comprises information or data related to the remote control of the at least one component of the at least one monitoring system.

Clause 19. The railroad locomotive monitoring system configuration system of any of clauses 1-18, wherein the on-board computer is further programmed or configured to determine at least a portion of the railroad operation data based upon data received from at least one positioning system.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
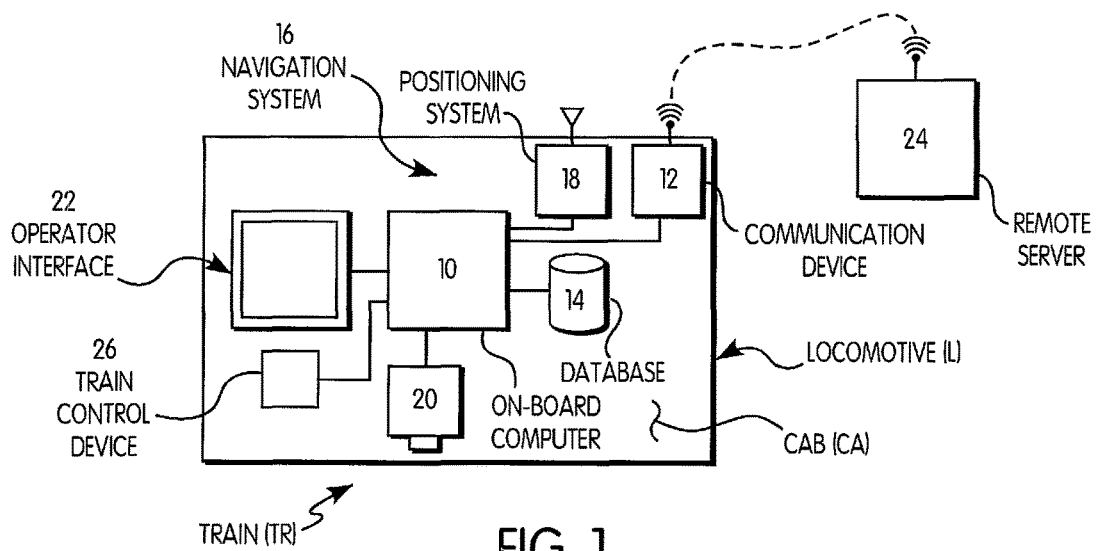
FIG. 1 is a schematic view of a locomotive for use in a railroad locomotive monitoring system configuration system according to the principles of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. It is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, and/or the like. It is to be noted that a "communication device" includes any device that facilitates communication (whether wirelessly or hard-wired (e.g., over the rails of a track)) between two units, such as two locomotive units or control cars. In one preferred and non-limiting embodiment or aspect, the "communication device" is a radio transceiver programmed, configured, or adapted to wirelessly transmit and receive radio frequency signals and data over a radio signal communication path.

The railroad locomotive monitoring system configuration system and computer-implemented method described and claimed herein may be implemented in a variety of systems and vehicular networks; however, the systems and methods described herein are particularly useful in connection with a railway system and network. Accordingly, the presently-invented methods and systems can be implemented in various known train control and management systems, e.g., the I-ETMS® of Wabtec Corp. The systems and methods described herein are useful in connection with and/or at least partially implemented on one or more locomotives or control cars that make up a train (TR), such as a train (TR) in a "push-pull" arrangement. It should be noted that multiple locomotives or control cars may be included in the train (TR) to facilitate the reduction of the train (TR) to match with passenger (or some other) demand or requirement. Further, the method and systems described herein can be used in connection with commuter trains, freight train, and/or other train arrangements and systems.

Accordingly, and in one preferred and non-limiting embodiment or aspect, and as illustrated in FIG. 1, the system architecture and layout used to support the functionality of at least some, of the methods and systems described herein includes a train management computer or on-board computer 10 (which performs calculations for, or within, the PTC system, including navigation calculations, and is typically located in one or more of the locomotives or control cars (L)), a communication device 12 or data radio (which may be used to facilitate the communications between the on-board computers 10 in one or more of the locomotives or control cars (L) of a train (TR), communications with a wayside device, e.g., signals, switch monitors, and the like, communications with the railcars and/or an end-of-train device, e.g., through a Trainline, and/or communications with a remote server, e.g., a back office server, a central controller, central dispatch, and/or), at least one database 14 (which may include information about the train or its operating parameters, track positions or locations, switch locations, track heading changes, e.g., curves, distance measurements, train information, e.g., the number of locomotives, the number of cars, the number of conventional passenger cars, the number of control cars, the total length of the train, the specific identification numbers of each locomotive or control car (L) where PTC equipment (e.g., an on-board computer 10) is located, and the like), and a navigation system 16 (optionally including a positioning system 18 (e.g., a Global Positioning System (GPS)) and/or a wheel tachometer/speed sensor 20). In addition, an operator interface 22 (e.g., an interactive display, a computer screen, a computer monitor, a display in communication with an input device, a display device, a display mechanism, and the like) is provided and in direct or indirect communication with the on-board computer 10 for displaying information and data to the operator/user. In addition, the on-board computer 10 may directly or indirectly communicate with one or more of the various train control devices and systems 26, such as the throttle system, the brake system, the safety or communication systems, the in-cab control systems, and the like. As used herein, the term "database" refers to any data structure or arrangement that facilitates the storage and retrieval of data using a computer, e.g., the on-board computer 10 discussed above.

Figure 2:
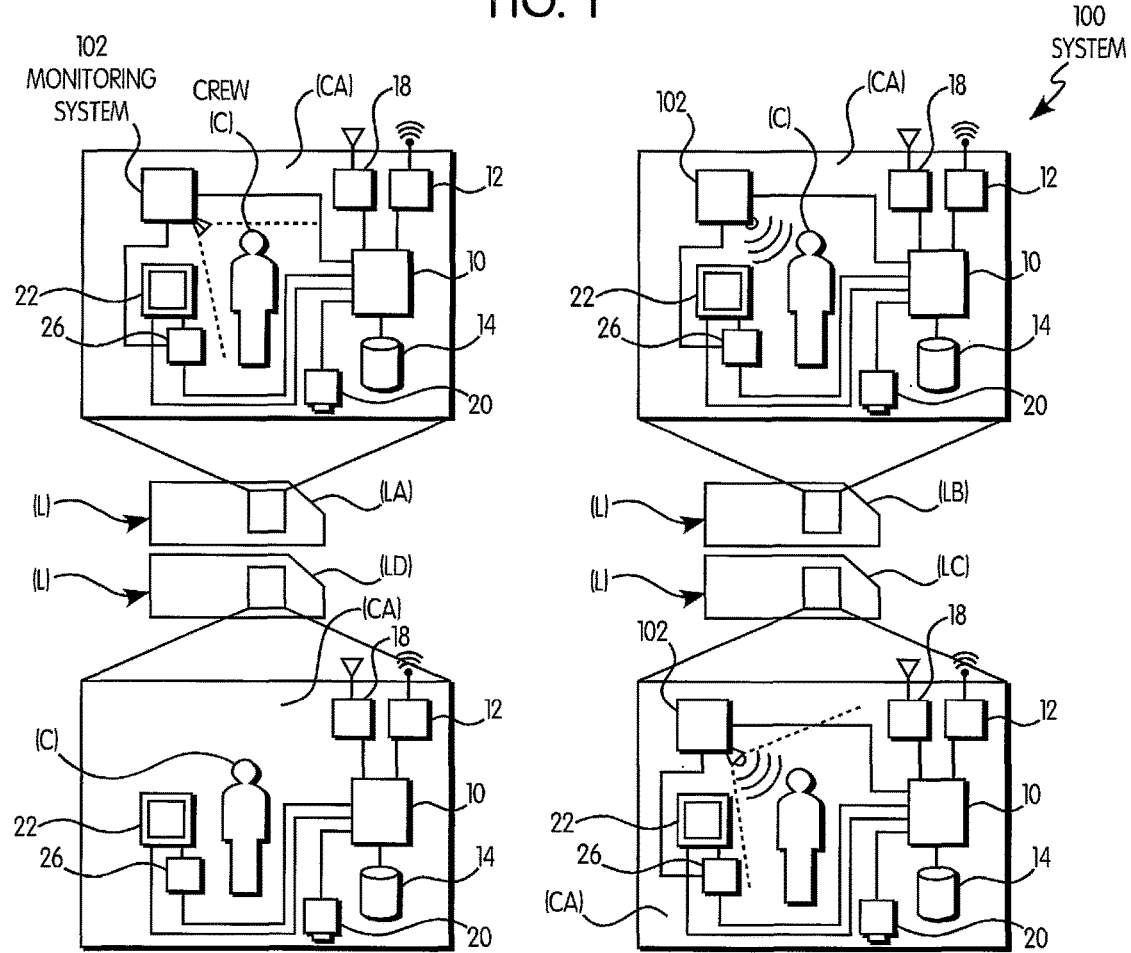
FIG. 2 is a schematic view of a railroad locomotive monitoring system configuration system according to the principles of the present invention.

As illustrated in schematic form in FIG. 2, and according to one preferred and non-limiting embodiment or aspect, provided is a railroad locomotive monitoring system configuration system 100 for a train (TR) having at least one locomotive or control car (L), and, normally, at least one railcar. In this embodiment or aspect, the system 100 is implemented on a plurality of trains (TR), each having at least one locomotive or control car (L), operating in at least one railroad's track network (RTN) (as illustrated in schematic form in FIG. 3). As used herein, the terms "owner" or "owns", and/or the concept of "ownership" refers to the entity, such as a railroad, that owns, employs, controls, operates, leases, holds, or otherwise has some rights in or associated with the section of track, the locomotive or control car (L), and/or the crew operating the train (TR). For example, a railroad entity may lease a specific locomotive or control car (L) and operate it on a track that they own or on track for which they have usage rights.

In one preferred and non-limiting embodiment or aspect, the system includes at least one monitoring system 102 that programmed, configured, or arranged to record or monitor at least one parameter or condition in or associated with the at least one locomotive or control car (L). For example, the monitoring system 102 may be programmed, configured, or arranged to monitor the conditions or the environment of the cab (CA) of the locomotive or control car (L), which is the area in the locomotive or control car (L) in which at least some of the crew (C), e.g., the engineer or operator, are located.

Figure 3:
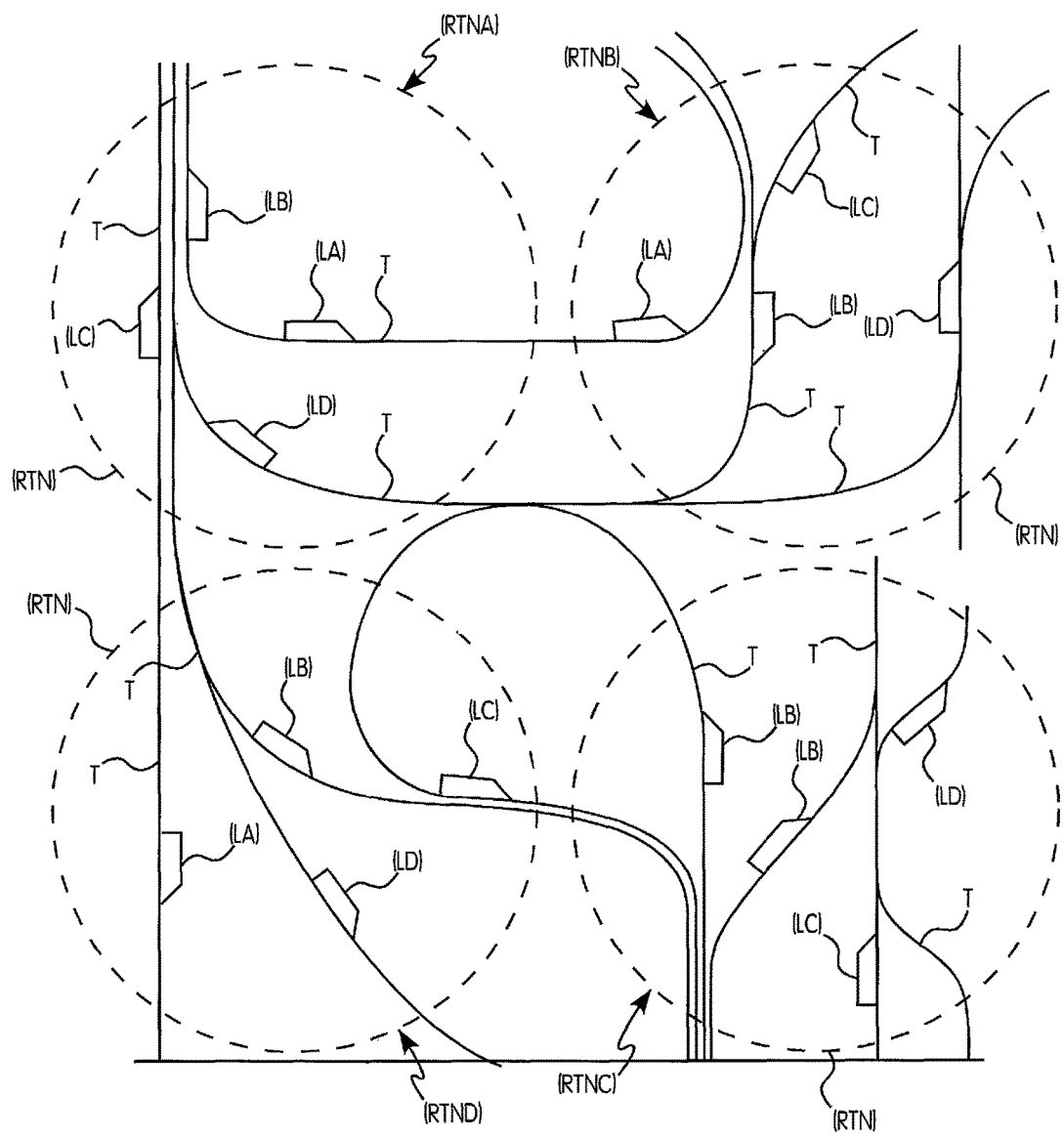
FIG. 3 is a schematic view of a railroad locomotive monitoring system configuration system deployed in multiple railroad's track networks.

As discussed above, the locomotive or control car (L) includes an on-board computer 10 located on or associated with the at least one locomotive or control car (L). This on-board computer 10 is programmed or configured to: (i) determine or receive railroad locomotive data representing information or data related to the locomotive or control car (L), e.g., the railroad that owns the at least one locomotive or control car (L), such as railroad A's locomotive (LA), railroad B's locomotive (LB), railroad C's locomotive (LC), and/or railroad D's locomotive (LD), the systems or components of the locomotive or control car (L), the settings, controls, parameters, and/or conditions associated with the locomotive or control car (L), and the like; (ii) determine or receive railroad operation data representing information or data related to at least one of the following: the railroad that owns the locomotive or control car, the railroad that owns the track (T) on which the at least one locomotive or control car (L) is operating (such as is illustrated in FIG. 3, the track (T) that is in the railroad's track network (RTN) (e.g., railroad A's track network (RTNA), railroad B's track network (RTNB), railroad C's track network (RTNC), and railroad D's track network (RTND)), the railroad that employs at least one member of at least one crew (C) that is operating the at least one locomotive or control car (L), or any combination thereof; (iii) determine or receive configuration data representing information or data related to at least one setting of or associated with at least one component of the at least one monitoring system 102; and (iv) based at least partially on at least a portion of the railroad locomotive data, at least a portion of the railroad operation data, and at least a portion of the configuration data, automatically configure at least one setting of the at least one component of the at least one monitoring system 102.

In one preferred and non-limiting embodiment or aspect, the at least one monitoring system 102 includes or is in the form of at least one of the following: at least one camera device, at least one video camera device, at least one sound recording device, at least one control feedback device, at least one interface, at least one camera interface, at least one video camera interface, at least one sound recording interface, at least one control feedback interface, or any combination thereof. Accordingly, the at least one monitoring system 102 may include or be in the form of a separate, stand-alone monitoring system or device, e.g., a video camera that is installed post-production on the locomotive or control car (L) and/or an interface that facilitates collection of data and information from some existing component on the locomotive or control car (L), e.g., an integrated camera device or visual data collection unit that was included in the original build of the locomotive or control car (L).

In one preferred and non-limiting embodiment or aspect, at least a portion of the configuration data is generated or identified based at least partially on compliance data. This compliance data may include or refer to information or data related to the railroad's obligations or requirements pursuant to at least one of the following: a contract, an agreement, a labor agreement, a policy, a Federal Railroad Association policy, a code, a law, or any combination thereof. In particular, the compliance data may refer to what the railroad may or may not install or use in the locomotive or control car (L) during operation and pursuant to some agreement, e.g., a labor contract with the crew's union. As expected, these obligations differ from railroad-to-railroad, and for the sake of satisfying these contractual obligations, the compliance may include detailed information about what equipment or processes may and may not be used when operating the locomotive or control car (L) in the railroad track network (RTN) or with the specific crew (C). Further, this compliance data may be used to satisfy and verify compliance within the railroad's own track network, e.g., railroad A's locomotive (LA) operating in their own network (RTNA), and/or compliance within another railroad track network (RTN), e.g., railroad A's locomotive (LA) operating with their own crew (C) in railroad B's track network (RTNB), railroad A's crew (C) operating railroad B's locomotive or control car (LB) in railroad C's track network (RTNC), and the like.

In one preferred and non-limiting embodiment or aspect, the automatic configuration includes enabling or disabling at least one of the following: operation of at least one component of the at least one monitoring system, at least one setting of at least one component of the at least one monitoring system, or any combination thereof. For example, the on-board computer 10 may turn "on" or "off" a video camera, a microphone, a control system, and the like, disable or enable sound recording on a video camera, disable or enable video recording on a video camera, disable or enable operational control of one or more of the components in the locomotive or control car (L), disable or enable control of the monitoring system 102, disable or enable remote control of the monitoring system 102, disable or enable, with or to the monitoring system 102, data upload, data download, communication, and the like, disable or enable adjustment of the field-of-view of the camera device, disable or enable one or more of a set of cameras, microphones, and/or feedback device, and the like. As discussed hereinafter, this setting adjustment step may be employed or implemented in connection with some functional component or system associated with the train.

In one preferred and non-limiting embodiment or aspect, at least one of the following: at least a portion of the railroad locomotive data, at least a portion of the railroad track data, at least a portion of the configuration data (and/or any of the information or data determined by or generated within the system 100), or any combination thereof, is populated on at least one database or data structure, e.g., database 14, on or associated with the at least one locomotive or control car (L). Any of this data may then be used in operations on the at least one locomotive or control car (L), used in operations in connection with another locomotive or control car (L), directly or indirectly transmitted to a third-party system or database, e.g., remote server 24, and the like. In this manner, any of the information or data in the system 100 can be used for purposes of verification, auditing, compliance, evidentiary support, analytics, and the like. For example, the compliance data can be used to demonstrate the compliance of the railroad with the labor agreement, and in turn, the data of the monitoring system 102 can be used to demonstrate the compliance of the crew (C) with this labor agreement.

In another preferred and non-limiting embodiment, the automatic configuration may occur immediately prior to, during, or immediately after a crew (C) change associated with the railroad track network, a specific portion or section of track, and/or the locomotive or control car (L). In one preferred and non-limiting embodiment or aspect, the on-board computer 10 (as part of the Positive Train Control (PTC) system) has knowledge of crew changes and can implement the process accordingly, while in another preferred and non-limiting embodiment or aspect, where the on-board computer 10 does not have this knowledge (e.g., non-PTC operation), the positioning system 18 may be used by the on-board computer 10 to implement the process. In one example, a short line crew operates a locomotive on class 1 track. If the short line had in-cab video recording, you would not want to disable it simply because they were operating on another railroad's track. In another example, railroad A's crew (C) is operating on class 1 track and railroad A wants to monitor when railroad A's crew (C) operates on class 1 track, even if the track is railroad B's track. Similarly, if railroad B agrees with its union to record railroad B's crew (C), railroad B would want to monitor railroad B's crew (C) on railroad B's locomotive or control car (L) even if it is operating on railroad C's track. However, if control and operation of the locomotive or control car (L) were subsequently turned over to railroad C's crew (C), railroad C would want the monitoring to be disabled.

In another preferred and non-limiting embodiment or aspect, at least one of the following: at least a portion of the railroad locomotive data, at least a portion of the railroad track data, at least a portion of the configuration data (and/or any of the information or data determined by or generated within the system 100), or any combination thereof, is directly or indirectly transmitted by at least one remote server 24 to the at least one database 14 on or associated with the at least one locomotive or control car (L). This facilitates control, by the railroad, e.g., central dispatch, to transmit the appropriate information and data to the at least one locomotive or control car (L) for use in configuration control and compliance. In another preferred and non-limiting embodiment or aspect, this transmission occurs prior to the locomotive or control car (L) traversing at least one specified portion of track (T), i.e., track (T) in a railroad's track network (RTN). In a further preferred and non-limiting embodiment or aspect, this transmission occurs prior to operation of the locomotive or control car (L) by the at least one crew (C), e.g., operation of railroad A's locomotive (LA) by the crew (C) of railroad B.

In one preferred and non-limiting embodiment or aspect, at least one of the following: at least a portion of the railroad locomotive data, at least a portion of the railroad track data, at least a portion of the configuration data (and/or any of the information or data determined by or generated within the system 100), or any combination thereof, is populated on (or transmitted from) at least one database on or associated with at least one of the following: the railroad that owns the locomotive or control car (L), the railroad that owns the track on which the at least one locomotive or control car is operating, the railroad that employs at least one member of at least one crew that is operating the at least one locomotive or control car, or any combination thereof. The distribution or storage of any of the information or data determined by or generated within the system 100 may occur based upon the needs of each individual railroad (or operator). As discussed above, this information or data can be transmitted throughout the system using any appropriate communication platform, and using any required or suitable network security transmission or communication protocols. As also discussed above, this transmission may occur prior to the locomotive or control car (L) traversing at least one specified portion of track (T) and/or prior to operation of the locomotive or control car (L) by the at least one crew (C).

In one preferred and non-limiting embodiment or aspect, the automatic configuration includes facilitating the enabling or disabling at least one of the following: access to the data generated by the at least one monitoring system 102, communicating data generated by the at least one monitoring system 102, uploading data to the at least one monitoring system 102, downloading data from the at least one monitoring system 102, or any combination thereof. As discussed above, access to and use of the data and information generated by the at least one monitoring system 102 can be automatically configured or controlled by one or more users, such as by the railroad of the locomotive or control car (L), the railroad of the track network, and the like. In addition, and in another preferred and non-limiting embodiment or aspect, the enablement or disablement is based at least partially on at least one of the following: at least a portion of the railroad locomotive data, at least a portion of the railroad track data, at least a portion of the configuration data (and/or any of the information or data determined by or generated within the system 100), or any combination thereof.

In one preferred and non-limiting embodiment or aspect, the at least one-board computer 10 is further programmed or configured to determine or receive interchange data (e.g., information or data related to the exchange of locomotives or control cars (L) by and between various railroads for use on the railroad's track network (RTN)). In another preferred and non-limiting embodiment or aspect, at least a portion of this interchange data is generated based at least partially on at least one of the following: at least a portion of the railroad locomotive data, at least a portion of the railroad track data, at least a portion of the configuration data (and/or any of the information or data determined by or generated within the system 100), or any combination thereof. In a further preferred and non-limiting embodiment or aspect, the interchange data includes or represents at least one of the following: interchange usage data (e.g., information or data related to the usage of the locomotive or control car (L)), invoicing data (e.g., information or data related to the charges or costs associated with using the locomotive or control car (L)), interchange event data (e.g., information or data related to events or occurrences associated with the use of the locomotive or control car (L)), interchange log data (e.g., information or data related to logged events or conditions), verification data (e.g., information or data related to the verifications of specified events, conditions, or actions), tag data (e.g., information or data related to radio frequency identification-based data (or other signal-based device information)), or any combination thereof.

In one preferred and non-limiting embodiment or aspect, the at least one on-board computer 10 is further programmed or configured to receive remote command data from at least one remote server 24. As discussed above, this remote command data may include information or data related to the remote control of the at least one component of the at least one monitoring system 102. For example, the remote command data may be used to facilitate a remote user, such as a user at the remote server 24 (e.g., a, employee at central dispatch of the railroad) to control the various settings or operation of one or more of the components of the monitoring system 102.

In one preferred and non-limiting embodiment or aspect, the on-board computer 10 is further programmed or configured to determine at least a portion of the railroad operation data based upon data received from the at least one positioning system 18. In particular, the information or data from the positioning system 18 may be used to automatically determine the presence of a specific locomotive or control car (L) in a specified railroad's track network (RTN). Of course, as discussed above, the information about or pertaining to the section of track, the crew changes, and the like may be obtained by or through the PTC system by the on-board computer 10. Accordingly, the enablement or disablement (or adjustment of the settings) of at least one component of the at least one monitoring system 102 can be automatically determined and effected while the locomotive or control car (L) is present in the specified railroad's track network (RTN) or in a track network or section of track wherein monitoring is required or desired.

In one exemplary embodiment or aspect, and as illustrated in FIG. 3, various locomotives or control cars (L) are operating in various railroad's track networks (RTN) (i.e., railroad owner A's track network (RTNA), railroad owner B's track network (RTNB), railroad owner C's track network (RTNC), and railroad owner D's track network (RIND)) (or with various crews (C)) i.e., railroad. As seen in FIG. 3, and in one example with respect to obligations or requirements related to the crews (C), railroad A is allowed to conduct video-only and train control feedback monitoring in its locomotives or control cars (LA) (or with its crews (C)), railroad B is allowed to conduct sound-only and train control feedback monitoring in its locomotives or control cars (LB) (or with its crews (C)), railroad C is allowed to conduct video, sound, and train control feedback monitoring in its locomotives or control cars (LC) (or with its crews (C)), and railroad D is not allowed any monitoring in its locomotives or control cars (LD) (or with its crews (C)). Accordingly, the system 100 is programmed or configured to automatically configure the monitoring systems 102 in each locomotive or control car ((LA), (LB), (LC), and (LD)) as set forth in Table 1 below.

TABLE 1

[Example Implementation]

| | Video Monitoring | Sound Monitoring | Train Control Feedback Monitoring |
|---|---|---|---|
| Locomotive A | | | |
| Crew A | Enabled | Not available | Enabled |
| Crew B | Disabled | Not available | Enabled |
| Crew C | Enabled | Not available | Enabled |
| Crew D | Disabled | Not available | Disabled |
| Locomotive B | | | |
| Crew A | Not available | Disabled | Enabled |
| Crew B | Not available | Enabled | Enabled |
| Crew C | Not available | Enabled | Enabled |
| Crew D | Not available | Disabled | Disabled |
| Locomotive C | | | |
| Crew A | Enabled | Disabled | Enabled |
| Crew B | Disabled | Enabled | Enabled |
| Crew C | Enabled | Enabled | Enabled |
| Crew D | Disabled | Disabled | Disabled |
| Locomotive D | | | |
| Crew A | Not available | Not available | Not available |
| Crew B | Not available | Not available | Not available |
| Crew C | Not available | Not available | Not available |
| Crew D | Not available | Not available | Not available |

Of course, it is envisioned that the compliance requirements (and settings or configurations of the monitoring system 102) may independent of the crew (C) and instead dependent upon the location of the locomotive or control car (L), e.g., based upon the location of the locomotive or control car (L) on a track (T) in a specific railroad's track network ((RTNA), (RTNB), (RTNC), (RTND)). In this case, the same logic above may be employed. For example, if railroad A only allows sound monitoring when a locomotive or control car (L) is travelling in railroad A's track network (RTNA), the video monitoring and the train control feedback monitoring functions of any monitoring system 102 may be disabled upon entry of the locomotive or control car (L) into railroad A's track network (RTNA) and enabled upon exiting railroad A's track network (RTNA) (with the "permitted" functionality automatically adjusted upon entry into the next railroad's track network (RTN), e.g., railroad B's track network (RTNB), railroad C's track network (RTNC), or railroad D' track network (RTND). This would ensure compliance with the railroad's rules or policies for locomotives or control cars (L) operating in its track network (RTN).

Further, this logic and automatic configuration process can be used in connection with any component or function of the monitoring system 102, e.g., monitoring, recording, uploading, downloading, communication, and the like, with the enablement or disablement based at least partially upon the configuration data and/or the compliance data (and/or based upon the operating crew (C) or the identity of the railroad's track network (RTN)). Still further, based upon new (or updated) configuration data and/or compliance data (e.g., negotiation of a new agreement, a change in the law, a change in a policy or rule, and the like), the system 100 can automatically enable or disable certain components or functionality of the monitoring system 102 in the railroad's own locomotives or control cars (L). In addition, the system 100 may be provided to generate and/or distribute messages or alerts whether a locomotive or control car (L) is not equipped in a manner to satisfy the configuration data and/or compliance data (and/or based upon the operating crew (C) or the identity of the railroad's track network (RTN)). Such messages or alerts may be generated by or provided to the on-board computer 10, the remote server 24, and/or some other computer of an authorized user.

In one preferred and non-limiting embodiment or aspect, provided is a railroad locomotive monitoring system configuration system 100 for a plurality of trains (TR), each having at least one locomotive or control car (L), operating in at least one railroad's track network (RTN). In this embodiment, the system 100 includes: at least one monitoring system 102 configured to record or monitor at least one parameter or condition in or associated with the at least one locomotive or control car (L); and an on-board computer 10 located on or associated with the at least one locomotive or control car (L) and programmed or configured to: (i) determine or receive railroad locomotive data representing information or data related to the at least one locomotive or control car (L); (ii) determine or receive railroad operation data representing information or data related to at least one of the following: the railroad that owns the locomotive or control car (L), the railroad that owns the track (T) on which the at least one locomotive or control (L) is operating, the railroad that employs at least one member of at least one crew (C) that is operating the at least one locomotive or control car (L), or any combination thereof; (iii) determine or receive compliance data representing information or data related to the railroad's obligations or requirements pursuant to at least one of the following: a contract, an agreement, a labor agreement, a policy, a Federal Railroad Association policy, a code, a law, or any combination thereof; and (iv) based at least partially on at least a portion of the railroad locomotive data, at least a portion of the railroad operation data, and at least a portion of the compliance data, automatically configured at least one setting of the at least one component of the at least one monitoring system 102.

In one preferred and non-limiting embodiment or aspect, provided is a railroad locomotive monitoring system configuration method for a plurality of trains (TR), each having at least one locomotive or control car (L), operating in at least one railroad's track network (RTN), wherein the at least one locomotive or control car (L) comprises at least one monitoring system 102 configured to record or monitor at least one parameter or condition in or associated with the at least one locomotive or control car (L). The method includes: (i) determining or receiving railroad locomotive data representing information or data related to the at least one locomotive or control car (L); (ii) determining or receiving railroad operation data representing information or data related to at least one of the following: the railroad that owns the locomotive or control car (L), the railroad that owns the track (TR) on which the at least one locomotive or control (L) is operating, the railroad that employs at least one member of at least one crew (C) that is operating the at least one locomotive or control car (L), or any combination thereof; (iii) determining or receiving configuration data representing information or data related to at least one setting of or associated with at least one component of the at least one monitoring system; and (iv) based at least partially on at least a portion of the railroad locomotive data, at least a portion of the railroad operation data, and at least a portion of the configuration data, automatically configuring at least one setting of the at least one component of the at least one monitoring system 102.

In one preferred and non-limiting embodiment or aspect, provided is a railroad locomotive monitoring system configuration method for a plurality of trains (TR), each having at least one locomotive or control car (L), operating in at least one railroad's track network (RTN), wherein the at least one locomotive or control car (L) comprises at least one monitoring system 102 configured to record or monitor at least one parameter or condition in or associated with the at least one locomotive or control car (L). The method includes: (i) determining or receiving railroad locomotive data representing information or data related to the at least one locomotive or control car (L); (ii) determining or receiving railroad operation data representing information or data related to at least one of the following: the railroad that owns the locomotive or control car (L), the railroad that owns the track (TR) on which the at least one locomotive or control car is operating, the railroad that employs at least one member of at least one crew (C) that is operating the at least one locomotive or control car (L), or any combination thereof; (iii) determining or receiving configuration data representing information or data related to at least one setting of or associated with at least one component of the at least one monitoring system 102; and (iv) based at least partially on at least a portion of the railroad locomotive data, at least a portion of the railroad operation data, and at least a portion of the configuration data, automatically configuring at least one setting of the at least one component of the at least one monitoring system 102.

In one preferred and non-limiting embodiment or aspect, provided is a railroad locomotive configuration system for a plurality of trains (TR), each having at least one locomotive or control car (L), operating in at least one railroad's track network (RTN), the system comprising: at least one functional component or system configured to implement at least one train control function; and an on-board computer 10 located on or associated with the at least one locomotive or control car (L) and programmed or configured to: (i) determine or receive railroad locomotive data representing information or data related to the at least one locomotive or control car; (ii) determine or receive railroad operation data representing information or data related to at least one of the following: the railroad that owns the locomotive or control car, the railroad that owns the track on which the at least one locomotive or control car is operating, the railroad that employs at least one member of at least one crew that is operating the at least one locomotive or control car (L), or any combination thereof; (iii) determine or receive configuration data representing information or data related to at least one setting of or associated with the at least one functional component or system; and (iv) based at least partially on at least a portion of the railroad locomotive data, at least a portion of the railroad operation data, and at least a portion of the configuration data, automatically configure at least one setting of the at least one functional component or system. In another preferred and non-limiting embodiment or aspect, the at least one functional component or system comprises at least one of the following: a monitoring component or system, a train control component or system, a braking component or system, a throttle component or system, a communication component or system, a display component or system, a configurable component or system, or any combination thereof.

In one exemplary embodiment, the presently-invented system may include or implement one or more of the following steps, processes, and/or functions:

1. The on-board computer 10 and/or the remote server 24 maintains a list of the locomotive functionality that is allowed on a railroad-by-railroad basis. The list may be maintained on the locomotive or control car (L), in whole or in part, or it may be maintained, in whole or in part, at one or more railroad's back offices and communicated to the on-board computer 10. It should be noted that, in this exemplary embodiment, the term "list" is being used in its general sense, and that the actual data may be stored in a database and/or data structure.

2. The on-board computer 10 determines the railroad that is operating the locomotive or control car (L), and enables the functionality if the "list" indicates that it is allowed for the railroad, or disables the functionality if the "list" indicates that it is not allowed for the railroad.

3. Functionality may be enabled or disabled at configurable points. For example, the on-board computer 10 may disable in-cab monitoring the instant that the locomotive or control car (L) crosses onto track (T) that is owned by a railroad that does not allow monitoring. Alternatively, the on-board computer 10 could disable in-cab monitoring at the first crew change in the territory of a railroad that does not allow such monitoring.

4. The decision to enable or disable functionality may be made on the locomotive or control car (L), solely, at the remote server 24 (e.g., the PTC back office), solely, or jointly between the locomotive or control car (L) and the remote server 24 working in conjunction.

5. Similarly, the system 100 could be used to prevent locomotive video data from being accessed or downloaded when the locomotive or control car (L) is not operating in its home (owning) railroad's track network (RTN).

6. The system 100 may also be programmed or configured to track and report interchange usage to the owning railroad. Current systems rely on locomotive automatic equipment identification (AEI) tag readings to determine when interchange has occurred, e.g., for billing purposes. Since the on-board computer 10 knows when interchange occurs, it could maintain a log of interchange events of a given locomotive or control car (L) as a verification of existing interchange billing, or potentially as a replacement for the AEI tag-based system.

7. The system 100 may also be programmed or configured to enable remote enabling and disabling of in-cab monitoring by someone in the railroad's dispatch office. This could be used to understand what is happening on the locomotive or control car (L) if an unusual event occurs, e.g., the engineer does not respond or if a warning occurs.

8. The system 100 may also leverage the information and data generated by the navigation system 16, e.g., the positioning system 18, which provides detailed, stand-alone track maps that are independent of the PTC system, such as for verification purposes.

9. When using the PTC system, the system 100 is highly accurate and can distinguish its location and the operating railroad with a high (vital) level of confidence using vital navigation and knowledge of the signaling system and train plan. A system based only on GPS may not be able to distinguish between adjacent tracks or determine the operating railroad at inter-lockings where two tracks (T) meet or cross. In addition, the PTC-based system constantly updates its track maps with current information, whereas a stand-alone GPS-based system would only have track map information that was current at the time the map was loaded into the device. Still further, the PTC-system could be dynamically updated as rules governing in-cab monitoring change. For example, if a railroad adopted in-cab monitoring, that functionality could be enabled by simply updating the "list" and transmitting it to the locomotive or control car (L), whereas a stand-alone GPS-based system would have to be updated before it would permit operation.

In this manner, the present invention provides improved system and methods for train parking or movement verification or monitoring.

Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope of the appended claims. For example, it is to be understood that the present invention contemplates that, to the extent possible, one or more features of any embodiment or aspect can be combined with one or more features of any other embodiment or aspect.

What is claimed is:

1. A railroad locomotive monitoring system configuration system for a plurality of trains, each having at least one locomotive or control car, operating in at least one railroad's track network, the system comprising:
    at least one monitoring system configured to record or monitor at least one parameter or condition in or associated with the at least one locomotive or control car; and
    an on-board computer located on or associated with the at least one locomotive or control car and programmed or configured to:
        (i) determine or receive railroad locomotive data representing information or data related to the at least one locomotive or control car, the railroad locomotive data comprising the at least one parameter or condition in or associated with the at least one locomotive or control car;
        (ii) determine or receive railroad operation data representing information or data related to at least one of the following: the railroad that owns the locomotive or control car, the railroad that owns the track on which the at least one locomotive or control car is operating, the railroad that employs at least one member of at least one crew that is operating the at least one locomotive or control car, or any combination thereof;
        (iii) determine or receive configuration data representing information or data related to at least one setting of or associated with at least one component of the at least one monitoring system; and
        (iv) based at least partially on at least a portion of the railroad locomotive data, at least a portion of the railroad operation data, and at least a portion of the configuration data, automatically configure at least one setting of the at least one component of the at least one monitoring system.

2. The railroad locomotive monitoring system configuration system of claim 1, wherein the at least one monitoring system comprises at least one of the following: at least one camera device, at least one video camera device, at least one sound recording device, at least one control feedback device, at least one interface, at least one camera interface, at least one video camera interface, at least one sound recording interface, at least one control feedback interface, or any combination thereof.

3. The railroad locomotive monitoring system configuration system of claim 1, wherein at least a portion of the configuration data is generated or identified based at least partially on compliance data, which comprises information or data related to the railroad's obligations or requirements pursuant to at least one of the following: a contract, an agreement, a labor agreement, a policy, a Federal Railroad Association policy, a code, a law, or any combination thereof.

4. The railroad locomotive monitoring system configuration system of claim 1, wherein the automatic configuration comprises enabling or disabling at least one of the following: operation of at least one component of the at least one monitoring system, at least one setting of at least one component of the at least one monitoring system, or any combination thereof.

5. The railroad locomotive monitoring system configuration system of claim 1, wherein at least one of the following: at least a portion of the railroad locomotive data, at least a portion of the railroad track data, at least a portion of the configuration data, or any combination thereof, is populated on at least one database on or associated with the at least one locomotive or control car.

6. The railroad locomotive monitoring system configuration system of claim 5, wherein at least one of the following: at least a portion of the railroad locomotive data, at least a portion of the railroad track data, at least a portion of the configuration data, or any combination thereof, is directly or indirectly transmitted by at least one remote server to the at least one database on or associated with the at least one locomotive or control car.

7. The railroad locomotive monitoring system configuration system of claim 6, wherein the transmission occurs prior to the locomotive or control car traversing at least one specified portion of track.

8. The railroad locomotive monitoring system configuration system of claim 6, wherein the transmission occurs prior to operation of the locomotive or control car by the at least one crew.

9. The railroad locomotive monitoring system configuration system of claim 1, wherein at least one of the following: at least a portion of the railroad locomotive data, at least a portion of the railroad track data, at least a portion of the configuration data, or any combination thereof, is populated on at least one database on or associated with at least one of the following: the railroad that owns the locomotive or control car, the railroad that owns the track on which the at least one locomotive or control car is operating, the railroad that employs at least one member of at least one crew that is operating the at least one locomotive or control car, or any combination thereof.

10. The railroad locomotive monitoring system configuration system of claim 9, wherein at least one of the following: at least a portion of the railroad locomotive data, at least a portion of the railroad track data, at least a portion of the configuration data, or any combination thereof, is directly or indirectly transmitted from the at least one database on or associated with the at least one locomotive or control car.

11. The railroad locomotive monitoring system configuration system of claim 10, wherein the transmission occurs prior to the locomotive or control car traversing at least one specified portion of track.

12. The railroad locomotive monitoring system configuration system of claim 10, wherein the transmission occurs prior to operation of the locomotive or control car by the at least one crew.

13. The railroad locomotive monitoring system configuration system of claim 1, wherein the automatic configuration comprises enabling or disabling at least one of the following: access to the data generated by the at least one monitoring system, communicating data generated by the at least one monitoring system, uploading data to the at least one monitoring system, downloading data from the at least one monitoring system, or any combination thereof.

14. The railroad locomotive monitoring system configuration system of claim 13, wherein the enablement or disablement is based at least partially on at least one of the following: at least a portion of the railroad locomotive data, at least a portion of the railroad track data, at least a portion of the configuration data, or any combination thereof.

15. The railroad locomotive monitoring system configuration system of claim 1, wherein the on-board computer is further programmed or configured to determine or receive interchange data comprising information or data related to interchange usage of the at least one locomotive or control car.

16. The railroad locomotive monitoring system configuration system of claim 15, wherein at least a portion of the interchange data is generated based at least partially on at least one of the following: at least a portion of the railroad locomotive data, at least a portion of the railroad track data, at least a portion of the configuration data, or any combination thereof.

17. The railroad locomotive monitoring system configuration system of claim 15, wherein the interchange data comprises at least one of the following: interchange usage data, invoicing data, interchange event data, interchange log data, verification data, tag data, or any combination thereof.

18. The railroad locomotive monitoring system configuration system of claim 1, wherein the on-board computer is further programmed or configured to receive remote command data from at least one remote server, wherein the remote command data comprises information or data related to the remote control of the at least one component of the at least one monitoring system.

19. The railroad locomotive monitoring system configuration system of claim 1, wherein the on-board computer is further programmed or configured to determine at least a portion of the railroad operation data based upon data received from at least one positioning system.

20. A railroad locomotive monitoring system configuration system for a plurality of trains, each having at least one locomotive or control car, operating in at least one railroad's track network, the system comprising:
  at least one monitoring system configured to record or monitor at least one parameter or condition in or associated with the at least one locomotive or control car; and
  an on-board computer located on or associated with the at least one locomotive or control car and programmed or configured to:
    (i) determine or receive railroad locomotive data representing information or data related to the at least one locomotive or control car, the railroad locomotive data comprising the at least one parameter or condition in or associated with the at least one locomotive or control car;
    (ii) determine or receive railroad operation data representing information or data related to at least one of the following: the railroad that owns the locomotive or control car, the railroad that owns the track on which the at least one locomotive or control car is operating, the railroad that employs at least one member of at least one crew that is operating the at least one locomotive or control car, or any combination thereof;
    (iii) determine or receive compliance data representing information or data related to the railroad's obligations or requirements pursuant to at least one of the following: a contract, an agreement, a labor agreement, a policy, a Federal Railroad Association policy, a code, a law, or any combination thereof; and
    (iv) based at least partially on at least a portion of the railroad locomotive data, at least a portion of the railroad operation data, and at least a portion of the compliance data, automatically configure at least one setting of the at least one component of the at least one monitoring system.

21. A railroad locomotive monitoring system configuration method for a plurality of trains, each having at least one locomotive or control car, operating in at least one railroad's track network, wherein the at least one locomotive or control car comprises at least one monitoring system configured to record or monitor at least one parameter or condition in or associated with the at least one locomotive or control car, the method comprising:
  (i) determining or receiving railroad locomotive data representing information or data related to the at least one locomotive or control car, the railroad locomotive data comprising the at least one parameter or condition in or associated with the at least one locomotive or control car;
  (ii) determining or receiving railroad operation data representing information or data related to at least one of the following: the railroad that owns the locomotive or control car, the railroad that owns the track on which the at least one locomotive or control car is operating, the railroad that employs at least one member of at least one crew that is operating the at least one locomotive or control car, or any combination thereof;
  (iii) determining or receiving configuration data representing information or data related to at least one setting of or associated with at least one component of the at least one monitoring system; and
  (iv) based at least partially on at least a portion of the railroad locomotive data, at least a portion of the railroad operation data, and at least a portion of the configuration data, automatically configuring at least one setting of at least one component of the at least one monitoring system.

22. A railroad locomotive monitoring system configuration method for a plurality of trains, each having at least one locomotive or control car, operating in at least one railroad's track network, wherein the at least one locomotive or control car comprises at least one monitoring system configured to record or monitor at least one parameter or condition in or associated with the at least one locomotive or control car, the method comprising:

(i) determining or receiving railroad locomotive data representing information or data related to the at least one locomotive or control car, the railroad locomotive data comprising the at least one parameter or condition in or associated with the at least one locomotive or control car;

(ii) determining or receiving railroad operation data representing information or data related to at least one of the following: the railroad that owns the locomotive or control car, the railroad that owns the track on which the at least one locomotive or control car is operating, the railroad that employs at least one member of at least one crew that is operating the at least one locomotive or control car, or any combination thereof;

(iii) determining or receiving compliance data representing information or data related to the railroad's obligations or requirements pursuant to at least one of the following: a contract, an agreement, a labor agreement, a policy, a Federal Railroad Association policy, a code, a law, or any combination thereof; and (iv) based at least partially on at least a portion of the railroad locomotive data, at least a portion of the railroad operation data, and at least a portion of the compliance data, automatically configuring at least one setting of the at least one component of the at least one monitoring system.

23. A railroad locomotive configuration system for a plurality of trains, each having at least one locomotive or control car, operating in at least one railroad's track network, the system comprising:

at least one functional component or system configured to implement at least one train control function; and an on-board computer located on or associated with the at least one locomotive or control car and programmed or configured to:

(i) determine or receive railroad locomotive data representing information or data related to the at least one locomotive or control car, the railroad locomotive data comprising at least one parameter or condition in or associated with the at least one locomotive or control car;

(ii) determine or receive railroad operation data representing information or data related to at least one of the following: the railroad that owns the at least one locomotive or control car, the railroad that owns the track on which the at least one locomotive or control car is operating, the railroad that employs at least one member of at least one crew that is operating the at least one locomotive or control car, or any combination thereof;

(iii) determine or receive configuration data representing information or data related to at least one setting of or associated with the at least one functional component or system; and (iv) based at least partially on at least a portion of the railroad locomotive data, at least a portion of the railroad operation data, and at least a portion of the configuration data, automatically configure at least one setting of the at least one functional component or system.

24. The railroad locomotive configuration system of claim 23, wherein the at least one functional component or system comprises at least one of the following: a monitoring component or system, a train control component or system, a braking component or system, a throttle component or system, a communication component or system, a display component or system, a configurable component or system, or any combination thereof.

* * * * *